United States Patent
Benjamin et al.

(10) Patent No.: US 8,978,863 B2
(45) Date of Patent: Mar. 17, 2015

(54) SILENT RATCHET AND METHOD FOR PRODUCING SAME

(75) Inventors: Milto Benjamin, Halle/Westfalen (DE); Michael Kuhlmann, Bielefeld (DE)

(73) Assignee: Rollax GmbH & Co. KG, Bad Salzuflen (DE)

( * ) Notice: Subject to any disclaimer, the term of this patent is extended or adjusted under 35 U.S.C. 154(b) by 158 days.

(21) Appl. No.: 13/811,084
(22) PCT Filed: Jul. 29, 2010
(86) PCT No.: PCT/EP2010/061061
§ 371 (c)(1), (2), (4) Date: Jan. 18, 2013
(87) PCT Pub. No.: WO2012/013234
PCT Pub. Date: Feb. 2, 2012

(65) Prior Publication Data
US 2013/0119212 A1 May 16, 2013

(51) Int. Cl.
F16D 41/064 (2006.01)
F16D 41/06 (2006.01)
F16D 41/066 (2006.01)
B21D 28/06 (2006.01)
B60N 2/16 (2006.01)

(52) U.S. Cl.
CPC .............. *F16D 41/064* (2013.01); *F16D 41/06* (2013.01); *F16D 41/066* (2013.01); *F16D 2250/00* (2013.01); *B21D 28/06* (2013.01); *B60N 2/167* (2013.01)
USPC .......................................... 192/223.2; 192/15

(58) Field of Classification Search
CPC .......... F16D 41/066; F16D 2041/0665; F16D 2250/0023; B60N 2/167; B60N 2/168
USPC .............................. 192/223.2, 15, 38, 45.019
See application file for complete search history.

(56) References Cited

U.S. PATENT DOCUMENTS

| 4,989,696 A | * | 2/1991 | Buell | 188/218 XL |
|---|---|---|---|---|
| 6,308,397 B1 | * | 10/2001 | Nishimura et al. | 29/469.5 |
| 6,481,557 B2 | * | 11/2002 | Denis | 192/223.2 |
| 6,575,279 B2 | * | 6/2003 | Quigley | 192/46 |
| 6,757,975 B1 | | 7/2004 | Todd et al. | |
| 2002/0148696 A1 | | 10/2002 | Enomoto et al. | |
| 2004/0112703 A1 | * | 6/2004 | Kremer | 192/46 |
| 2007/0137978 A1 | * | 6/2007 | Yamada et al. | 192/223.2 |

FOREIGN PATENT DOCUMENTS

| DE | 803141 | 3/1951 |
|---|---|---|
| DE | 1905797 | 12/1964 |
| DE | 2121544 | 12/1971 |
| DE | 102006046495 A1 | 4/2008 |
| EP | 0743221 A2 | 11/1996 |
| EP | 1188946 A1 | 3/2002 |
| JP | 2002-301956 A | 10/2002 |
| JP | 2002-310198 A | 10/2002 |
| WO | 01/12428 A1 | 2/2001 |

* cited by examiner

*Primary Examiner* — Richard Lorence
(74) *Attorney, Agent, or Firm* — Richard M. Goldberg

(57) ABSTRACT

A silent ratchet including at least one clamping element (16) and an outer ring (12) and an inner ring (14) arranged coaxially in the outer ring, the inner and outer rings together forming a raceway (18) and a clamping contour (20') for the clamping element (16), wherein the outer ring (12) and the inner ring (14) are each formed by a plurality of lamella (12a-12d; 14a-14c) stacked one over the other and rigidly held together.

8 Claims, 4 Drawing Sheets

SILENT RATCHET AND METHOD FOR PRODUCING SAME

BACKGROUND OF THE INVENTION

The invention relates to a silent ratchet having at least one clamping element, an outer ring, and an inner ring arranged coaxially in the outer ring, wherein the outer ring and the inner ring together form a raceway and a clamping contour for the clamping element.

A typical example of such a silent ratchet is a freewheel wherein, when a torque acts in one direction, clamping rollers are blocked at the clamping contour so that the torque can be transmitted, whereas, when the torque acts in the opposite direction, the clamping rollers roll along the raceway so that no torque is transmitted. Moreover, silent ratchet mechanisms are used in so-called freewheel brakes wherein a torque can be transmitted in both directions by means of the clamping elements when the torque is introduced via a release element, whereas no torque is transmitted when the force is introduced via a blocking element.

Conventionally, each of the inner ring and the outer ring are formed as a one-piece metal body, and the clamping contour is obtained by machining, e.g. milling, of the inner and outer peripheral surface, respectively, of this metal body. Typically, the raceways are hardened afterwards.

U.S. Pat. No. 2002/148 696 A1 discloses a silent ratchet of this type, wherein the outer ring is formed by a stack of superposed lamella.

DE 10 2006 046 495 A1 discloses a silent ratchet wherein the inner ring is formed by two lamella sandwiching, as a third lamella, a switching wheel that is rotatable relative to the lamella of the inner ring.

SUMMARY OF THE INVENTION

It is an object of the invention to provide a silent ratchet and a method of producing the same, which permit cost savings.

In order to achieve this object, according to the invention, each of the outer ring and the inner ring are formed by a plurality of lamella that are stacked one over the other and rigidly held together.

The production of this silent ratchet does not require an expensive machining of metal parts, but instead the inner ring and the outer ring can simply be formed by stacking a plurality of lamella which take the form of flat steel sheets one upon the other. The lamella with the desired clamping contour can be obtained at low costs, e.g. by punching, and when the lamella are bonded or form-fittingly locked in the required position, the edges of the individual lamella together form the clamping contour. The lamella of the inner ring and the outer ring can be produced with only little waste of material by using the steel sheet that is obtained in the production of the annular lamella for the outer ring by punching-out the center of this lamella as a blank for the corresponding lamella of the inner ring.

The production method according to the invention has the further advantage that different silent ratchet mechanisms that are designed for different loads may be produced in an efficient way, simply by varying the number of stacked lamella.

Useful details of the invention are indicated in the dependent claims.

The form-fitting lock of the lamella can be obtained for example by means of pins inserted therethrough or by means of bosses that are pressed-out on the surface of the lamella and engage in corresponding depressions of the respective adjacent lamella.

A freewheel brake requires an additional release element that has claws projecting into the raceway between the inner ring and the outer ring and serves for urging the clamping elements into a non-clamping position. Then, the invention offers the advantageous possibility to form the release element by one or more disks that are interposed between the lamella. This simplifies the production of the release element and at the same time provides a favorable distribution of forces.

When the inner ring shall be keyed onto a shaft, the invention permits an inexpensive production of the key structures at the internal peripheral surface of the inner ring because these structures may be formed in the process of punching the lamella.

EP 0 743 221 A2 describes an adjusting mechanism for vehicle seats which is formed by two concatenated freewheel brakes. The outer ring of the first freewheel brake can selectively be rotated from a neutral position in either direction by means of an actuating lever. In this case, the torque is transmitted by a clamping element to the inner ring which itself drives the release element as well as a drive output element of the second freewheel brake. Then, the rotation of the drive output element effects the adjustment of the vehicle seat, e.g. an adjustment of the inclination of the seat back or else an adjustment of the seat height. The release element of the first freewheel brake is subject to the force of a return spring. When the actuating lever is released, the return spring returns the actuating lever whereas the inner ring of the first freewheel brake and the components of the second freewheel brake remain in the position they have reached. When a torque acts upon the drive output element, the second freewheel brake will block, so that the drive output element is locked at the casing. In this way, the seat member to be adjusted is arrested in its position.

The invention permits a particularly compact design of such an adjusting mechanism. Preferably, the inner and outer rings of both freewheel brakes are composed of lamella. Then, the lamella of the inner ring of the first freewheel brake are connected to form a packet not only with one another but also with the release member of the second free-wheel brake. The drive output element is preferably formed by a shaft that is corotatably keyed to the inner ring of the second freewheel brake. The release element of the second freewheel brake and the lamella of the inner ring of the first freewheel brake may also be in engagement with key grooves of the shaft, although with a certain play, so that a limited rotation of the release element relative to the shaft is possible. This rotation is necessary for the clamping elements of the second freewheel brake to be held in the non-clamping position during the adjustment operation. As soon as this play has been consumed, the shaft, i.e. the drive output element, is directly driven by the release element and the inner ring of the first freewheel brake. This permits a stable transmission of high torques as well as a reliable support for the shaft.

BRIEF DESCRIPTION OF THE DRAWING

Embodiment examples of the invention will now be described in greater detail in conjunction with the drawings, wherein.

DETAILED DESCRIPTION

Figure 1:
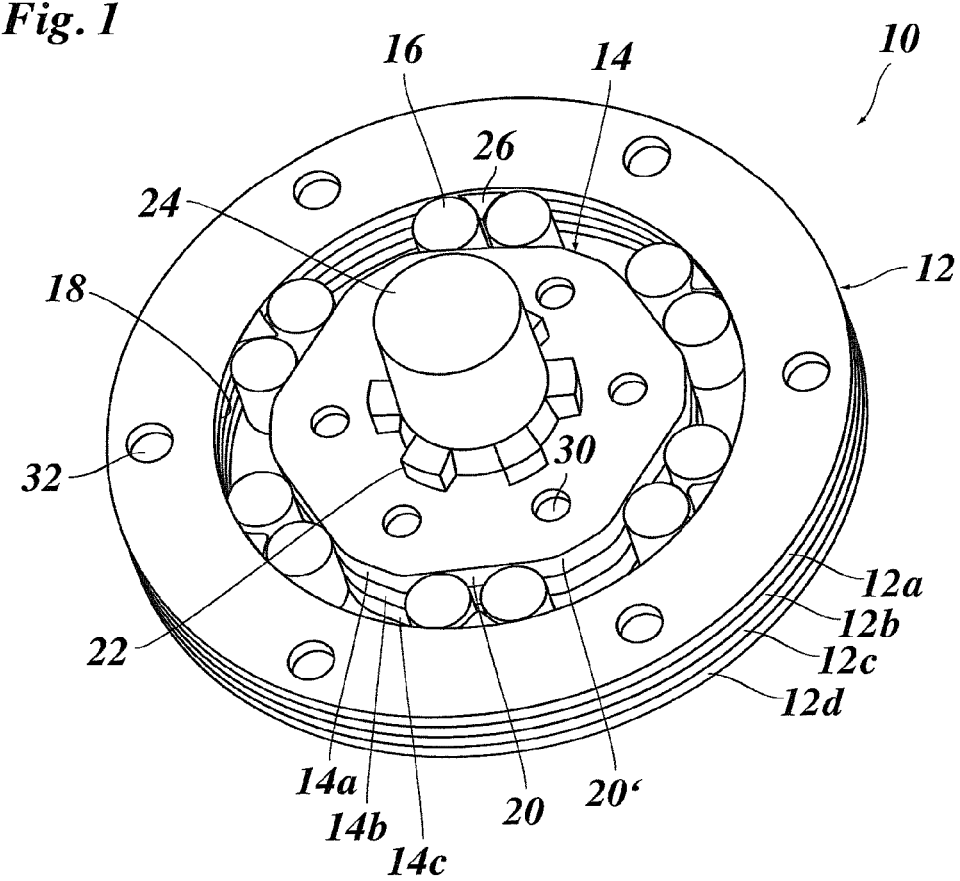
FIG. 1 is a perspective view of a silent ratchet according to the invention.

As an example for a silent ratchet, FIG. 1 shows a freewheel brake 10 that comprises an outer ring 12, an inner ring 14, and a plurality of clamping elements 16 that are configured as clamping rollers in this case and are arranged in pairs between the inner and outer rings. The cylindrical internal surface of the outer ring 12 forms a raceway 18 for the clamping elements. The outer peripheral surface of the inner ring 14 forms another raceway 20 for the clamping elements. This raceway 20, however, is not circular, but forms a clamping contour 20' with elevations that project radially outwardly and reduce the clear dimension of the annular gap between the inner and outer rings to a value that is smaller than the diameter of the clamping rollers.

The inner ring 14 is co-rotatably locked on keys 22 of a shaft 24. By way of example it shall be assumed here that the silent ratchet 10 forms part of a seat adjuster, e.g. a height adjustor for a vehicle seat. Then, the shaft 24 is connected to the height adjusting mechanism either directly or via a transmission that has not been shown, so that a rotation of the shaft 24 will effect an adjustment of the height of the seat. When an external force is exerted upon the seat, e.g. by the body of an occupant of the seat, the shaft 24 is subject to a torque that has the tendency to rotate the shaft together with the inner ring 14. Then, however, irrespective of the direction of rotation, six of the twelve clamping elements 16 will enter into the narrowing part of the gap between the inner and outer rings so that the inner ring 14 is blocked at the outer ring 12 by clamp action. In this way, a rotation of the shaft 24 is prevented and, consequently, the seat is held in the position to which it has been adjusted.

The clamping elements 16 form a total of six pairs, and an elastic spacer 26 is arranged between the clamping elements of each pair.

The silent ratchet 10 further comprises a release element that has not been shown in FIG. 1 and is arranged to be rotatable on the shaft 24 but is in engagement with the keys 22 with little play, so that it may be rotated by a small angle relative to the inner ring 14. This release element has claws that engage in the interstices between the individual pairs of clamping elements 16.

When, now, the height of the seat shall be adjusted actively, a torque is exerted on the release element by means of a drive mechanism that has not been shown. A small rotation of the release element relative to the inner ring 14 has the consequence that the claws press onto a respective one of the two clamping elements 16 of each pair and compress the spacer 26. This prevents the clamping element that is contacted by the claw from entering deeper into the narrowing part of the gap between the inner ring and the outer ring and to produce a clamp action. When the rotation of the release element continues, the shaft 24 is entrained by the inner ring 14. Since the claws prevent the silent ratchet from being blocked, the release element, the inner ring 14 and the shaft 24 are rotated in the desired direction, so that the height of the seat is adjusted. In this process, the clamping elements 16 roll over the raceway 18 of the stationary outer ring 12. When no torque acts upon the release element any longer, the seat is blocked in the position to which it has been adjusted.

It is an outstanding feature of the silent ratchet that is being described here that the inner ring 14 is not formed by a massive metal body but by a stack of flat, disk-like lamella 14a-14c made of steel sheet. Thus, the clamping contour 20' is formed by the edges of the lamella 14a-14c that are flush with each other. Correspondingly, the outer ring 12 is also formed by a stack of lamella 12a-12d in the example shown. Thanks to this design, the production of the inner ring and the outer ring is simplified significantly. For example, the lamella having the desired contour for the inner ring and the outer ring may simply be punched from a steel sheet of suitable thickness. Then, the punched lamella are stacked one upon the other and hardened so as to form a rigid raceway for the clamping elements 16.

Figure 2:
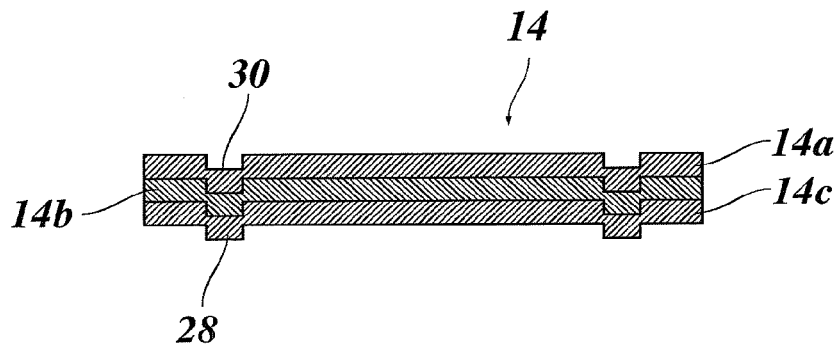
FIG. 2 is a schematic sectional view of a lamella stack in the silent ratchet shown in FIG. 1.

In order to prevent the lamella 14a-14c of the inner ring 14 from being rotated or displaced relative to one another, several bosses 28 are pressed-out so as to project from one surface of each lamella, as can be seen in the sectional view in FIG. 2. This creates a depression 30 corresponding to the boss 28 on the opposite side of each lamella. When the lamella are stacked in the manner shown in FIG. 2, the bosses 28 engage in the respective depressions 30 of the adjacent lamella, so that the lamella are form-fittingly locked to one another. In a corresponding manner, the lamella 12a-12d of the outer ring 12 are also form-fittingly locked by bosses (not visible) and corresponding depressions 32.

Figure 3:
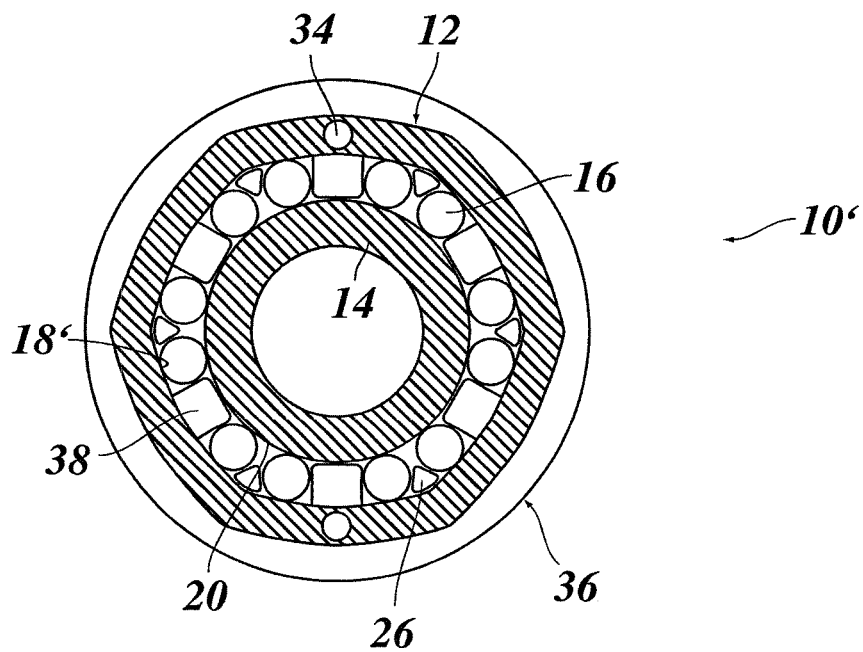
FIG. 3 is a horizontal cross-section of a silent ratchet according to another embodiment.

FIG. 3 is a cross-sectional view of a silent ratchet 10' according to another embodiment. In this example, the inner raceway of the outer ring 12 forms a non-circular clamping contour 18', whereas the inner ring 14 forms a circular raceway 20. Again, the outer ring 12 and the inner ring 14 are composed of lamella, and a respective one of these lamella is shown in section in FIG. 3. The form-fitting lock of the lamella of the outer ring 12 is achieved in this example by means of pins 34 that are inserted through aligned bores of the lamella.

FIG. 3 further shows a release element 36 of the silent ratchet 10', and claws 38 of this release element are visible in the interstices between the clamping elements 16.

Figure 4:
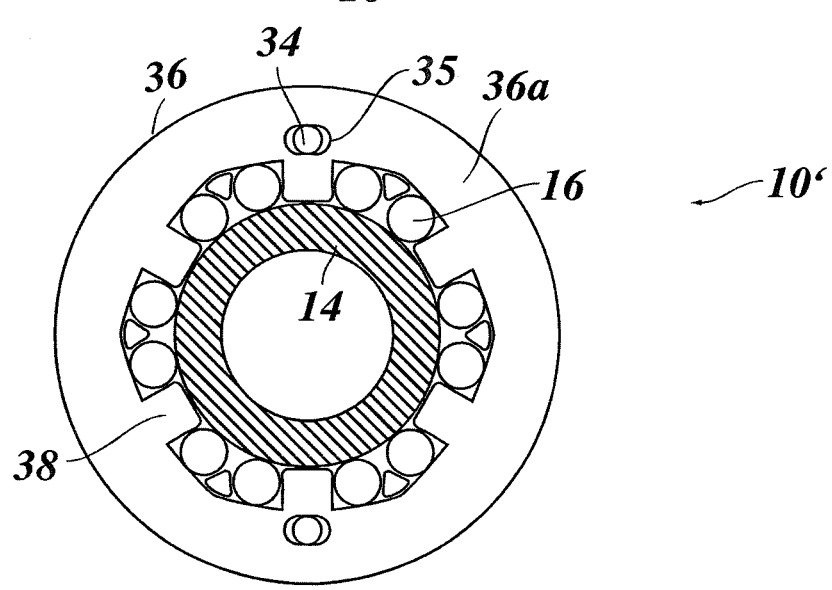
FIG. 4 is a cross-sectional view of the silent ratchet shown in FIG. 3 in a different sectional plane.
Figure 5:
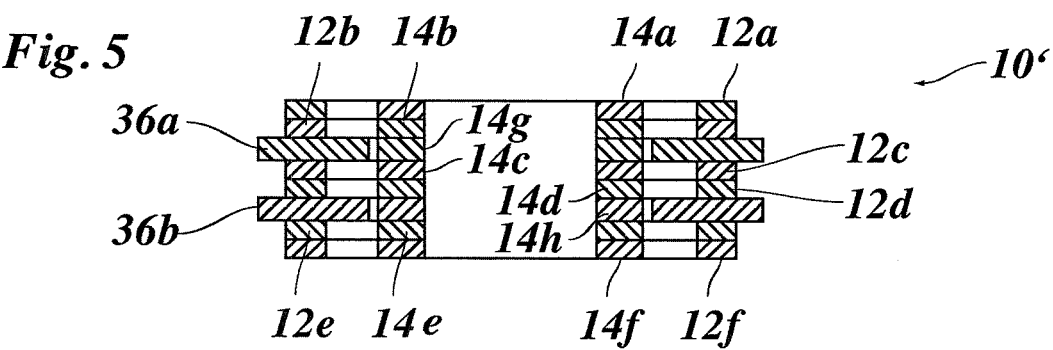
FIG. 5 is a vertical section of the silent ratchet according to FIGS. 3 and 4.

The lamellar design of the outer ring 12 permits also a new design of the release element 36. Whereas such release elements have heretofore been formed as pot-shaped elements engaging into the gap between the inner ring and the outer ring with axially projecting claws, the release element 36 of the example described here is formed by one or more disks 36a, 36b (two in the example shown) which are interposed between the individual lamella of the outer ring. In FIG. 4, the plane of the cross-section has been selected such that one disk 36a can be seen face-on. FIG. 5 illustrates the lamellar construction of the entire silent ratchet 10'. The outer ring is formed by six lamella 12a-12f in this example, and the inner ring has six lamella 14a-14f which are respectively level with the corresponding lamella of the outer ring, as well as two additional lamella 14g, 14h the positions and thicknesses of which correspond to those of the disks 36a, 36b of the release element 36.

The disks 36a, 36b of the release element are evenly distributed over the entire height of the silent ratchet 10', and the claws 38 are formed directly at the internal edge of the disks, so that they can act upon the clamping elements 16 via a short lever arm, thus avoiding substantial bending moments in the claws.

In order for the release element 36 to be rotatable relative to the outer ring 12, the disks 36a, 36b have respective elongated holes 35 (FIG. 4) through which the pins 34 pass through.

Lamella that are identical with the lamella 12a-12d and 14a-14c in FIGS. 1 and 2 or the lamella 12a-12f and 14a-14h in FIG. 5 may be used for forming inner and outer rings with different thicknesses, so that different types of silent ratchet mechanisms that are adapted to different load requirements may be manufactured in an efficient way. In the example shown in FIGS. 3 to 5, the number of the disks of the release element 36 may also be varied.

In a typical silent ratchet mechanism, either the inner ring or the outer ring is rigidly connected to a casing part. This connection may also be achieved in a simple manner by means of the bosses 28 shown in FIG. 2 or the pins 34 shown in FIG. 3. Correspondingly, the disks of the release element 36 will also be held together by pins. Optionally, they may also be held together by the drive mechanism. For example, the outer peripheral edges of the disks 36a, 36b may be configured as toothed gears that mesh with a drive pinion that has not been shown.

Figure 6:
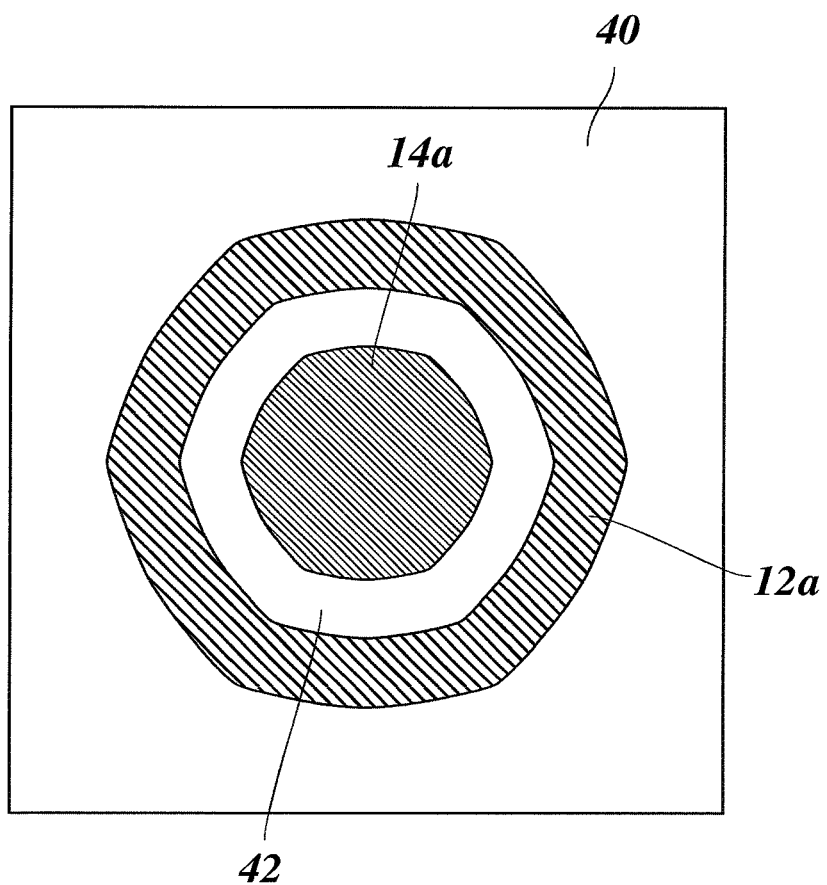
FIG. 6 is a plan-view of two lamella, illustrating a method of producing the silent ratchet.

FIG. 6 illustrates a method with which the lamellar for the inner and outer rings of the silent ratchet may be punched from a plane steel sheet 40 with only little waste. In the example shown, a lamella 12a for the outer ring of the silent ratchet of the type shown in FIGS. 1 and 2 or the type shown in FIGS. 3 to 5 is punched out of the steel sheet. Inside the lamella 12a, there remains an approximately circular piece of sheet that serves as a blank 42 for punching a lamella 14a for an inner ring of the same or a different silent ratchet. The lamella 12a and 14a may be formed in a single punching step or optionally in two separate steps. When silent ratchet mechanisms with different diameters are to be manufactured, is also possible to punch-out more than two rings nested one in the other.

Figure 7:
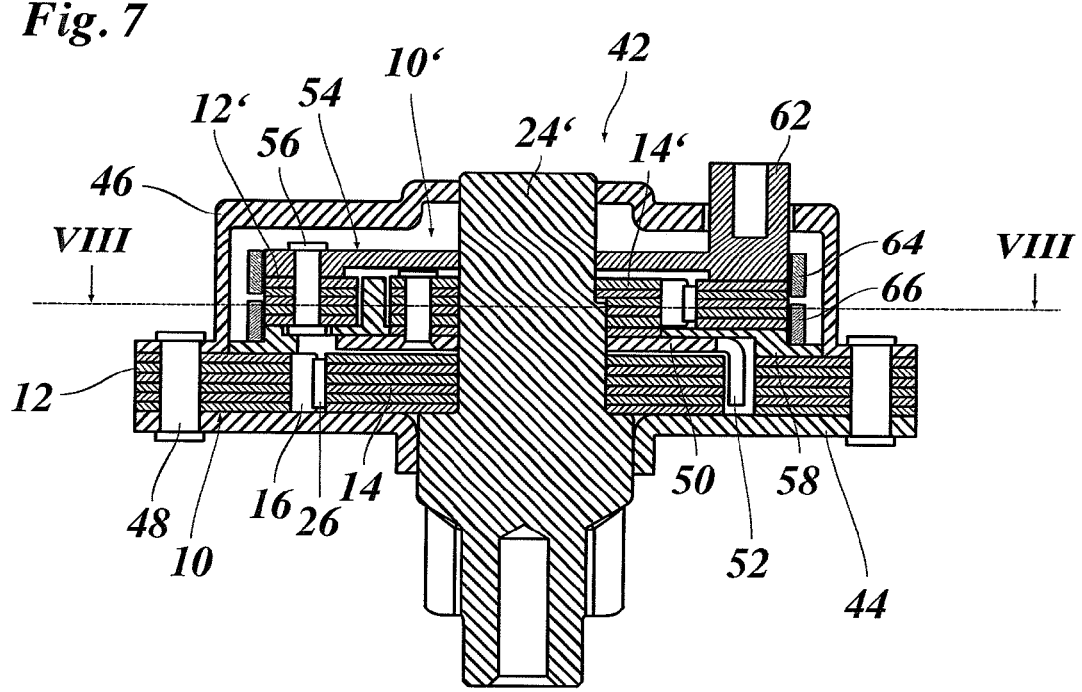
FIG. 7 is an axial cross-section of an adjusting mechanism having silent ratchet mechanisms according to another embodiment of the invention.

FIG. 7 illustrates an adjusting mechanism, e.g. a seat height adjustor for vehicles. The adjusting mechanism has two concatenated silent ratchet mechanisms 10, 10' that are respectively configured as freewheel brakes and are accommodated in a common casing. The casing has a base plate 44 and a cover 46 held together by rivets 48. The lamella of the outer ring 12 of the silent ratchet 10 are interposed between the base plate 44 and the cover 46 and are rotatably held in the casing by the rivets 48. The lamella of the inner ring 14 of the silent ratchet 10 are co-rotatably keyed to a shaft 24' that is rotatably supported in the casing. Similarly as in FIG. 1, the clamping contour is formed by the external surface of the inner ring 14.

A release element 50 of the silent ratchet 10 has the form of a flat disk that is also keyed on the shaft 24' but has a little rotary play relative to this shaft. As the outer periphery, the release element has claws 52 that engage in the annular gap between the inner and outer rings of the silent ratchet 10.

The inner ring 14' of the silent ratchet 10' is formed by a stack of lamella that are superposed on the release element 50 and are held together with one another and with the release element 50 by rivets (no reference sign). The lower lamella of the inner ring 14' in FIG. 7 have grooves held in engagement with keys of the shaft 24', so that they are rotatable with limited play relative to the shaft, just as the release element 50. The top lamella are disposed above the keys of the shaft 24' and engage the peripheral surface of a cylindrical portion of the shaft 24' on the entire circumference, so that the shaft is supported with high precision.

The outer ring 12' of the silent ratchet 10' forms the clamping contour of this silent ratchet and is composed of lamella on which a lever adapter 54 is disposed. The lamella and the lever adapter 54 are held together by rivets 56.

A release element 58 of the silent ratchet 10' is interposed between the lamella of the outer ring 12' of the silent ratchet 10' and the release element 50 of the silent ratchet 10. On its internal periphery, the release element 58 has upwardly projecting claws 60 (FIG. 8) that engage in the annular gap between the inner ring and the outer ring of the silent ratchet 10'. In order to achieve a particularly compact design, the bottom heads of the rivets 56 are accommodated in arcuate elongated holes of the release element 58.

The lever adapter 54 has two screw guides 62 that penetrate arcuate elongated holes of the cover 46 and permit to attach an actuating lever that has not been shown.

Figure 8:
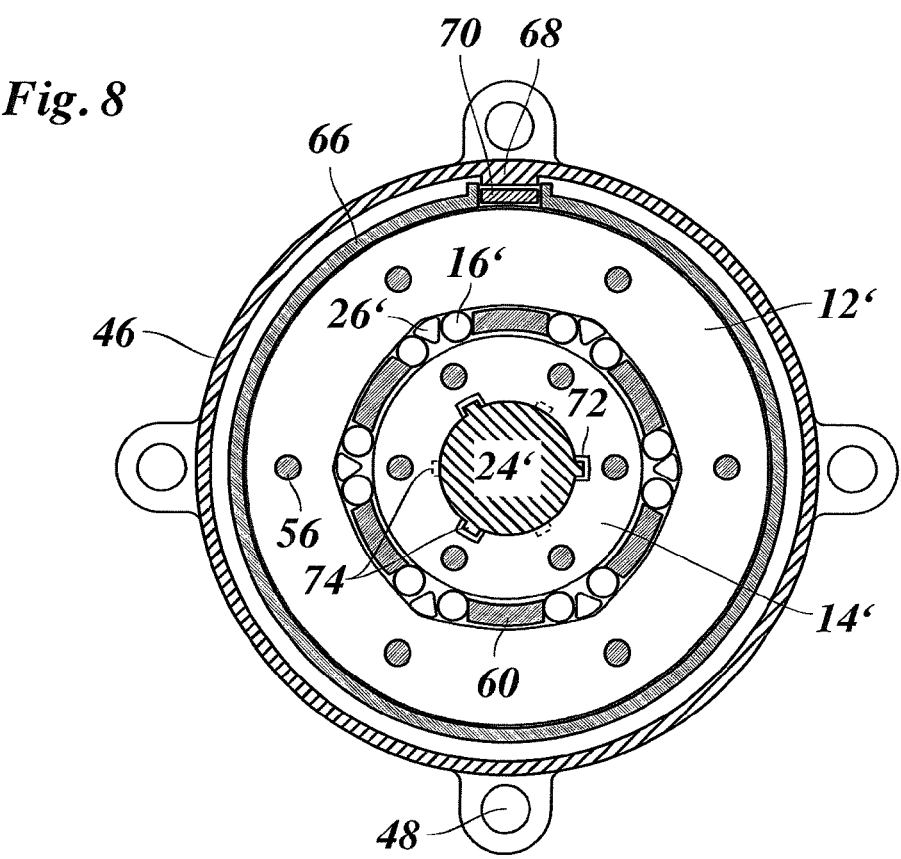
FIG. 8 is a sectional view taken along the line VIII-VIII in FIG. 7.

FIG. 8 shows the arrangement of clamping elements 16' and spacers 26' of the silent ratchet 10' between the lamella of the inner ring 14' and the lamella of the outer ring 12' of the silent ratchet 10' as well as the claws 60 of the release element 58.

The outer ring of the silent ratchet 10' is surrounded by two annular lock springs 64, 66 (the lock spring 64 being visible only in FIG. 7). As is shown in FIG. 8, the ends of the lock spring 66 are on one side fixed at a lug 68 at the internal surface of the cover 46 and on the other side at a lug 70 that projects from the release element 58. Correspondingly, the ends of the lock spring 64 are fixed at a lug 68 fixed to the casing and to a lug (not shown) of the lever adapter 54.

The operation of the adjusting mechanism will be described below.

The lever adapter 54 and the actuating lever mounted thereon are held in a neutral position by the lock spring 64. When the actuating lever is pivoted from the neutral position in one or the other direction, the lever adapter 54 is rotated about the shaft 24' and entrains the outer ring of the silent ratchet 10'. The clamping elements 16' cause the silent ratchet 10' to block, so that the inner ring 14' of this silent ratchet will also be rotated. The release element 50 of the silent ratchet 10 participates also in this rotation, and the claws 52 of this release element prevent the lower silent ratchet 10 in FIG. 7 from blocking.

In FIG. 8, three keys 74 of the shaft 24' are shown in a sectional view. These keys engage with play in corresponding grooves 72 of the lamella of the inner ring 14'. As soon as the inner ring 14' has been rotated by a small amount, the shaft 24' is therefore entrained in rotary direction.

When the inner ring and the outer ring of the top silent ratchet 10' are rotated, the release element 58 will also be entrained against the restoring force of the lock spring 66. The torque is transmitted from the lamella of the outer ring 12' via the clamping elements 16' and the spacers 26' onto the claws 60 of the release element 58.

When, now, the actuating lever is released, the lock spring 66 presses against the lug 70 and returns the release element 58 towards the neutral position. The release element thereby unlocks the silent ratchet 10'. Consequently, the inner ring 14' stays in the position that it has reached, and the outer ring, the lever adapter 54, and the actuating lever turn alone into the neutral position. The lock spring 64 assists in returning the lever adaptor. Thus, although the lever adapter 54 and the packet of lamella of the outer ring 12' are slightly rotatable relative to the release element 58, the actuating lever is stably held in the neutral position.

At the level of the silent ratchet 10', the shaft 24' has three additional keys 74 that have been indicated in phantom lines in FIG. 8. By means of these keys, the shaft 24' is keyed to the inner ring of the silent ratchet 10 without play. When the seat is subject to a load and exerts a torque onto the shaft 24', this torque will consequently be transmitted to the inner ring of the silent ratchet 10. However, since the associated release element 50 does not experience a torque, the clamping elements 16 of the silent ratchet 10 cause the ratchet to block, so that the shaft 24' is safely locked at the outer ring of the silent ratchet 10 and consequently at the casing.

In this way, the adjusting mechanism 42 permits to adjust the vehicle seat in any desired direction by repeatedly "pumping" with the actuating lever, and then to safely lock the seat in the position it has reached.

What is claimed is:

1. A silent ratchet comprising:
    at least one clamping element,
    an outer ring,
    and an inner ring arranged coaxially in the outer ring,
    said inner and outer rings together forming a raceway and a clamping contour for the at least one clamping element, and
    the outer ring and the inner ring are each formed by a plurality of lamella stacked one over the other and ridgidly held together,
    wherein the silent ratchet is configured as a freewheel brake having a release element comprising claws that engage in interstices between a plurality of clamping elements of the at least one clamping element, and
    wherein the release element is formed by at least one disk interposed between the lamella of the outer ring.

2. The silent ratchet according to claim 1, wherein the respective lamella of the inner ring and the outer ring that are level with one another have the same thickness.

3. The silent ratchet according to claim 1, wherein the lamella are form-fittingly locked at one another.

4. The silent ratchet according to claim 3, wherein the lamella have bosses and depressions complementary thereto for the form-fitting lock of the lamella.

5. The silent ratchet according to claim 3, wherein the lamella are form-fittingly locked together by pins passing therethrough.

6. The silent ratchet according to claim 1, wherein the clamping contour is formed at an external peripheral surface of the inner ring by the lamella thereof.

7. The silent ratchet according to claim 1, wherein the clamping contour is formed at an inner peripheral surface of the outer ring by the lamella thereof.

8. The silent ratchet according to claim 1, wherein the lamella of the inner ring have key grooves at inner peripheral surfaces thereof held in engagement with keys of a shaft that passes through the inner ring.

\* \* \* \* \*